US012648550B2

(12) United States Patent
Matsuno

(10) Patent No.: US 12,648,550 B2
(45) Date of Patent: Jun. 9, 2026

(54) FISHING REEL

(71) Applicant: GLOBERIDE, Inc., Higashikurume (JP)

(72) Inventor: Keisuke Matsuno, Higashikurume (JP)

(73) Assignee: GLOBERIDE, INC., Tokyo (JP)

( * ) Notice: Subject to any disclaimer, the term of this patent is extended or adjusted under 35 U.S.C. 154(b) by 127 days.

(21) Appl. No.: 18/903,554

(22) Filed: Oct. 1, 2024

(65) Prior Publication Data

US 2025/0228225 A1 Jul. 17, 2025

(30) Foreign Application Priority Data

Jan. 17, 2024 (JP) ................................. 2024-005240

(51) Int. Cl.
*A01K 89/01* (2006.01)
*A01K 89/015* (2006.01)

(52) U.S. Cl.
CPC ................................. *A01K 89/0187* (2015.05)

(58) Field of Classification Search
CPC .............. A01K 89/017; A01K 89/0186; A01K 89/0188; A01K 89/0189
See application file for complete search history.

(56) References Cited

U.S. PATENT DOCUMENTS

| | | | | |
|---|---|---|---|---|
| D284,496 S | * | 7/1986 | Kaneko | ......................... D22/140 |
| 4,738,409 A | * | 4/1988 | Sato | ................. A01K 89/01912 |
| | | | | 242/241 |
| 5,222,995 A | * | 6/1993 | Sato | ................... A01K 89/0192 |
| | | | | 242/258 |

| | | | | |
|---|---|---|---|---|
| 5,775,614 A | * | 7/1998 | Yamaguchi | ........ A01K 89/0186 |
| | | | | 242/279 |
| 2012/0104135 A1 | * | 5/2012 | Toma | ................... A01K 89/015 |
| | | | | 242/227 |
| 2023/0172180 A1 | | 6/2023 | Jo et al. | |
| 2023/0345923 A1 | | 11/2023 | Matsuno | |

FOREIGN PATENT DOCUMENTS

| | | | | |
|---|---|---|---|---|
| CN | 104705263 A | * | 6/2015 | ........... A01K 89/033 |
| JP | H11-346612 A | | 12/1999 | |
| JP | 2000014287 A | * | 1/2000 | |
| JP | 2001145442 A | * | 5/2001 | ........... A01K 89/033 |
| JP | 2002-238416 A | | 8/2002 | |
| KR | 20070055316 A | * | 5/2007 | ........... A01K 89/017 |
| TW | 202322692 A | | 6/2023 | |
| TW | 202341861 A | | 11/2023 | |

OTHER PUBLICATIONS

Jul. 24, 2025 Office Action issued in Taiwanese Patent Divisional Application No. 113150781.

* cited by examiner

*Primary Examiner* — Emmanuel M Marcelo
(74) *Attorney, Agent, or Firm* — Oliff PLC

(57) ABSTRACT

Provided is a fishing reel comprising a clutch mechanism that switches a spool around which a fishing line is wound between a power transmission state and a power interruption state, in which the clutch mechanism comprises a clutch lever, an actuating member configured to be rotationally displaced in accordance with a rotational operation of the clutch lever by a user, and a support case configured to support the clutch lever, the actuating member, and an actuating member receiving seat, the actuating member receiving seat interferes with the actuating member to stop rotation of the actuating member, and a rigidity of a material forming the actuating member receiving seat is lower than a rigidity of a material forming the support case.

5 Claims, 9 Drawing Sheets

FISHING REEL

CROSS-REFERENCE TO RELATED APPLICATION

This application claims priority under 35 U.S.C. § 119 to Japanese Patent Application No. 2024-005240 filed on Jan. 17, 2024 in the Japanese Patent Office, the entire contents of each hereby incorporated by reference.

BACKGROUND OF THE INVENTION

1. Technical Field

The present invention relates to a fishing reel comprising a clutch mechanism.

2. Description of the Related Art

Some fishing reels include a type provided with a clutch mechanism. The clutch mechanism has a function of switching a spool rotatably supported by a reel main body between a fishing line winding drive state (power transmission state) and a spool free state (power interruption state). As the clutch mechanism, for example, a plate connected to a clutch lever, such as a cam plate (49) in JP H11-346612 A (FIGS. 5 and 6) described later, is used, and a movement of the plate is restricted by a surrounding stopper structure (a rotation-preventing protrusion (41c) or the like).

SUMMARY OF THE INVENTION

Meanwhile, in the fishing reel, a strong external force or impact acts on the clutch mechanism, as the clutch lever is turned on and off. In particular, for example, in a fishing reel for relatively large fish such as Japanese privet and yellowfin tuna, a weight used for charging is heavy, and tension of a yarn is also high. For this reason, a movement of an angler operating the clutch tends to be strong, and it is necessary to sufficiently increase a strength of a clutch portion. In addition, the fishing reel is required not only to have a high strength but also to have a high design property.

The present invention has been made in view of the above problems, and an object thereof is to provide a fishing reel capable of appropriately improving a strength of a clutch mechanism.

In order to solve the above problems, a fishing reel according to the present invention comprises a clutch mechanism that switches a spool around which a fishing line is wound between a power transmission state and a power interruption state, in which the clutch mechanism comprises a clutch lever, an actuating member that is connected to the clutch lever and configured to be rotationally displaced in accordance with a rotational operation of the clutch lever by a user, and a support case configured to support the clutch lever, the actuating member, and an actuating member receiving seat, the actuating member receiving seat interferes with the actuating member to stop rotation of the actuating member, and a rigidity of a material forming the actuating member receiving seat is lower than a rigidity of a material forming the support case.

According to the present invention, it is possible to provide a fishing reel capable of appropriately improving a strength of a clutch mechanism.

DETAILED DESCRIPTION

Hereinafter, an embodiment of the present invention will be described with reference to the drawings.

Figure 1:
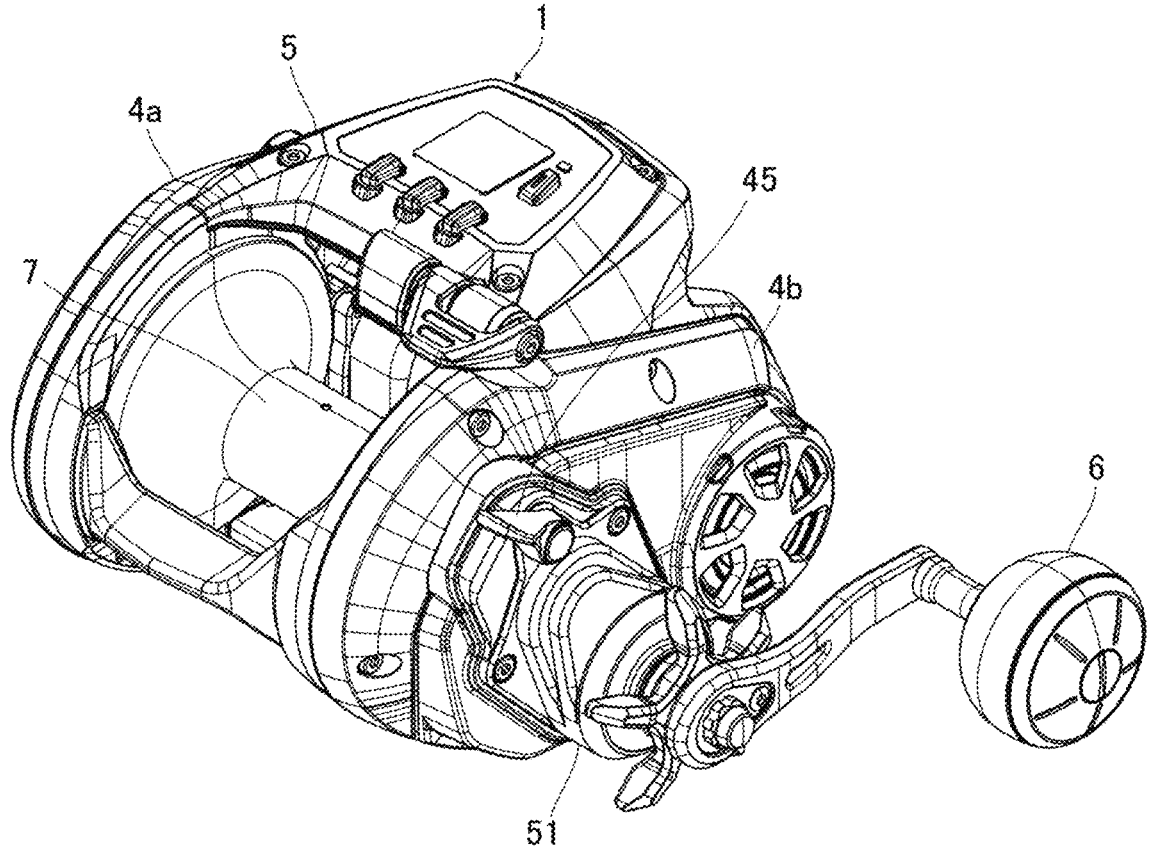
FIG. 1 is a perspective view illustrating a fishing reel according to an embodiment of the present invention.
Figure 2:
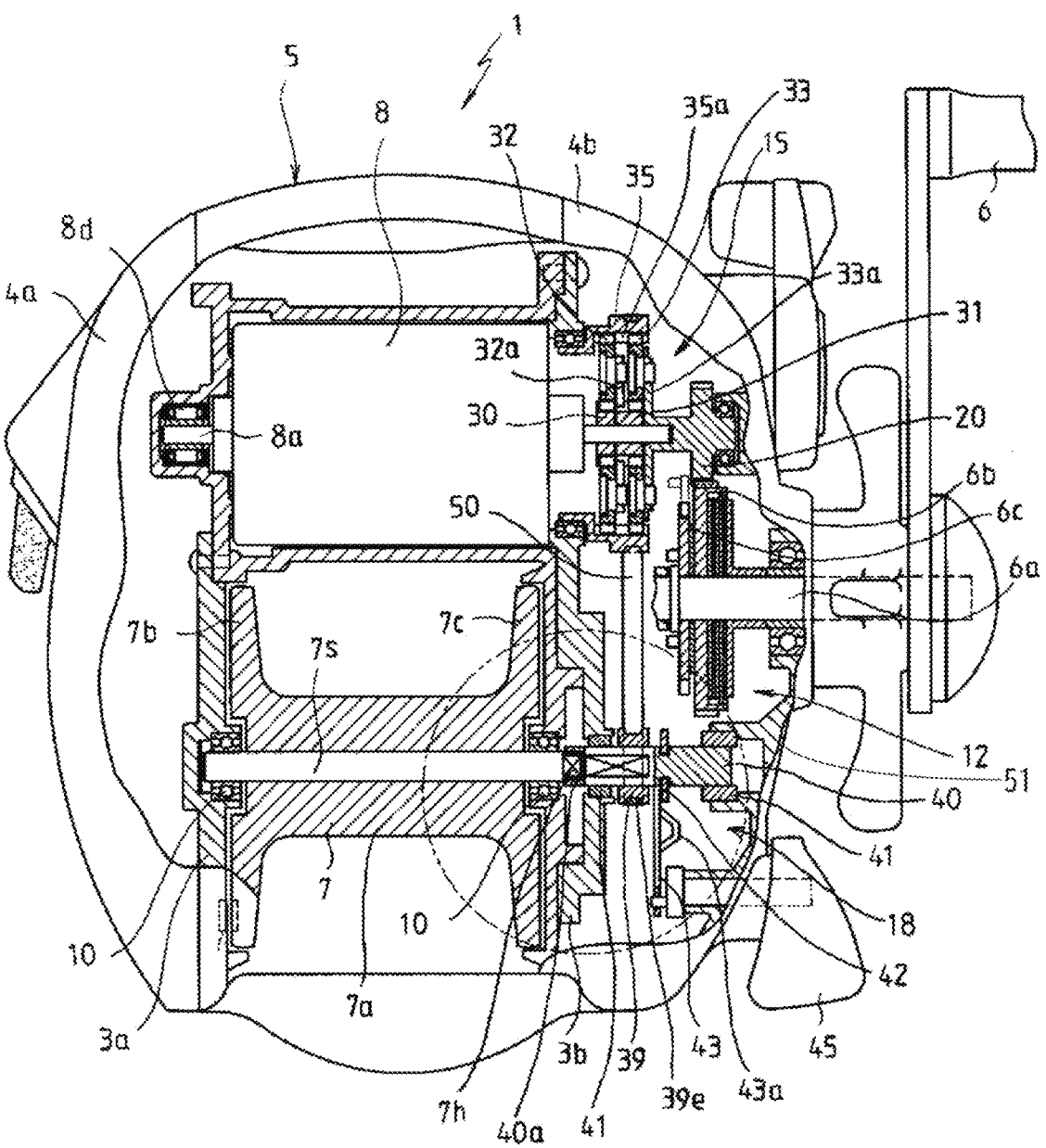
FIG. 2 is a plan view illustrating an internal structure of the fishing reel.
Figure 3:
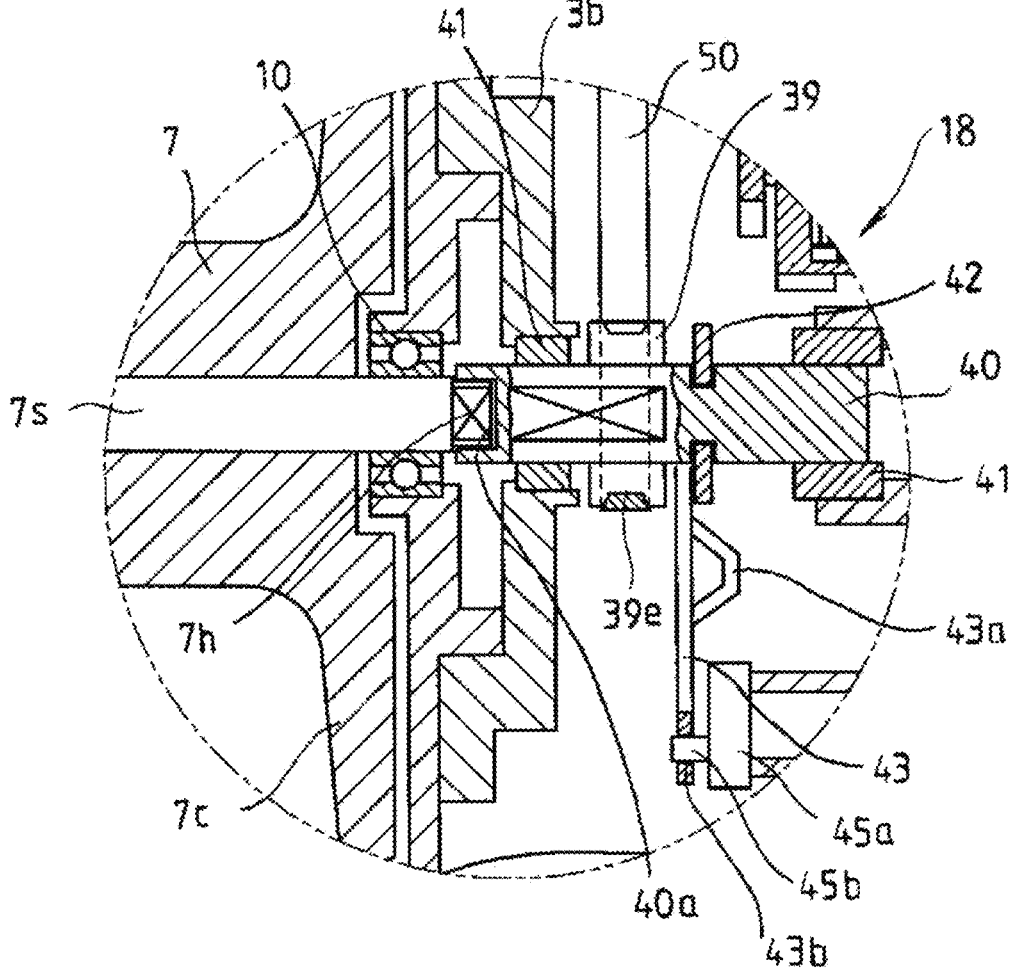
FIG. 3 is an enlarged view illustrating the internal structure of the fishing reel in a power transmission state (clutch ON)
Figure 4:
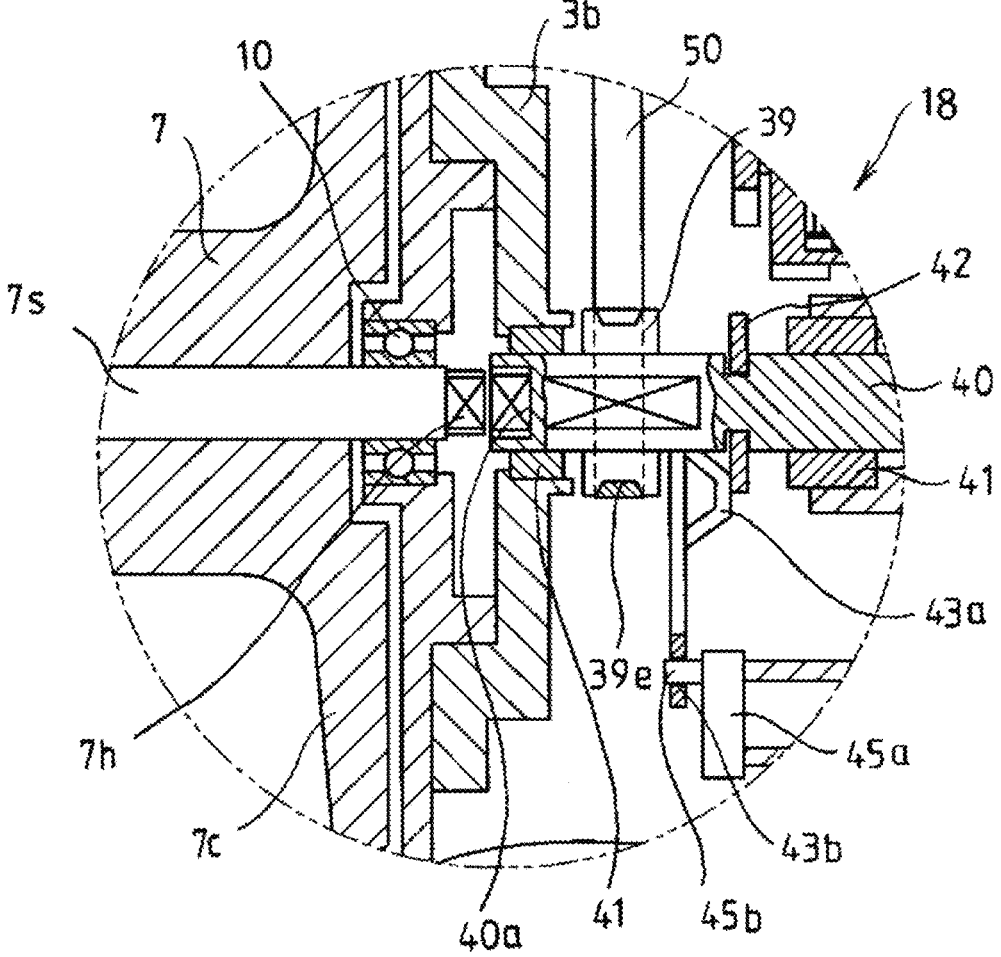
FIG. 4 is an enlarged view illustrating the internal structure of the fishing reel in a power interruption state (clutch OFF)

FIGS. 1 to 3 illustrate a fishing electric reel 1 as an embodiment of the present invention, and FIG. 1 is a perspective view of the fishing electric reel 1 and is drawn with reference numerals to a ridgeline design model created by CAD. FIG. 2 is a plan view illustrating an internal structure, and FIGS. 3 and 4 are enlarged views illustrating main parts of FIG. 2. FIG. 3 is a view illustrating a power transmission state (clutch ON), and FIG. 4 is a view illustrating a power interruption state (clutch OFF).

As illustrated in FIGS. 1 and 2, the fishing electric reel 1 of the present embodiment comprises a reel main body 5 configured by attaching outer plates 4a and 4b to left and right frames 3a and 3b. A manual handle 6 to be wound is provided on one side plate (right side plate 4b) configuring the reel main body 5. A spool 7 around which a fishing line is wound is rotatably supported between the left and right frames 3a and 3b configuring the reel main body 5. A driving motor 8 is held between the left and right frames on the front side of the spool 7. The spool 7 is rotationally driven in a fishing line winding direction via a power transmission mechanism described later by a winding operation of the manual handle 6 and a rotational drive of the driving motor 8.

The spool 7 comprises a fishing line winding drum portion 7a around which a fishing line is wound, and flanges 7b and 7c that regulate the fishing line to be wound are formed at both ends of the fishing line winding drum portion 7a. The spool 7 is fixed to a spool shaft 7s, and both end sides of the spool shaft 7s are supported by the frames 3a and 3b via bearings 10 so as to be rotatably supported between the frames.

Further, a locking portion 7h having a non-circular cross section is formed at an end of the spool shaft 7s on the right side plate side so that an engaging portion 40a of a clutch actuating member 40 of a clutch mechanism described later is disengaged. In this case, the locking portion 7h has a function as a power transmission portion so that the clutch actuating member 40 and the spool 7 rotate integrally, and is formed of, for example, a recess, a protrusion, an uneven portion, or the like having a non-circular cross section.

A rotational driving force from the manual handle 6 and the driving motor 8 is input to the spool 7 via a power transmission mechanism 12. In this case, the power transmission mechanism 12 comprises a reduction mechanism 15 that decelerates the rotational drive of the driving motor 8, and a clutch mechanism 18 that switches power transmission in the power transmission mechanism 12 between a power transmission state and a power interruption state. Hereinafter, configurations of the power transmission mechanism 12, the reduction mechanism 15, and the clutch mechanism 18 will be described.

The power transmission mechanism 12 of the present embodiment is collectively installed on the right frame (right side plate) 4b side of the reel main body 5, and comprises a handle shaft 6a that rotatably supports the manual handle 6, a drive gear 6b attached on the handle shaft 6a, a connecting gear 20 that meshes with the drive gear 6b and is connected to the reduction mechanism 15, and a belt 50 interposed between the reduction mechanism 15 and the clutch mechanism 18.

The reduction mechanism 15 is configured to reduce the rotational driving force of the driving motor 8 by a planetary gear mechanism provided in parallel, and comprises a first planetary gear 32 and a second planetary gear 33 that mesh with a first sun gear 30 and a second sun gear 31 provided in parallel with a drive shaft 8a of the driving motor 8, respectively. In this case, the first sun gear 30 is fixed to the drive shaft 8a, and the second sun gear 31 is freely rotatable. Each of the planetary gears 32 and 33 meshes with an internal tooth 35a formed in an output rotating body 35, and a first carrier 32a supporting the first planetary gear 32 is connected and fixed to the second sun gear 31. A second carrier 33a supporting the second planetary gear 33 is connected and fixed to the connecting gear 20.

The handle shaft 6a is provided with a reverse rotation prevention mechanism 6c to prevent interlocking rotation of the manual handle 6 when the driving motor 8 is rotationally driven. Note that the reverse rotation prevention mechanism 6c of the present embodiment is configured as a reverse rotation prevention ratchet attached to the handle shaft 6a, but may be configured by a one-way clutch. Further, a one-way clutch 8d is attached to a protruding portion of the drive shaft 8a of the driving motor 8 on the left side plate side so as not to idle when the manual handle 6 is wound and so as to transmit power to the spool 7 side.

The rotational driving force of the output rotating body 35 configuring the reduction mechanism 15 is transmitted to an input rotating body 39 associated with the clutch mechanism 18, and in the present embodiment, the transmission of the rotational driving force between the two is performed via a power transmission belt 50. That is, grooves 35e and 39e are formed on outer peripheral surfaces of the output rotating body 35 and the input rotating body 39, respectively, and power is transmitted by winding the belt 50 around these portions.

The clutch mechanism 18 comprises a shaft-like clutch actuating member 40 rotatably supported between the right frame 3b and the right side plate 4b via a pair of bearings 41 and movably supported along an axial direction, an actuating plate 42 engaged with the clutch actuating member 40, a clutch plate 43 engaged with the actuating plate 42 and moving the clutch actuating member 40 in the axial direction, and an operation lever (clutch lever) 45 that rotationally drives the clutch plate 43. Note that a non-circular outer peripheral portion formed on one side of the clutch actuating member 40 is fitted to a non-circular circumferential portion inside the input rotating body 39 so as to be prevented from rotating.

The engaging portion 40a fitted to the locking portion 7h having a non-circular cross section formed on the spool shaft 7s is formed on the spool side of the clutch actuating member 40. The engaging portion 40a and the locking portion 7h are engageable and disengageable and have a fitting relationship having a non-circular cross section as described above, and when the engaging portion and the locking portion are fitted to each other, the spool 7 rotates integrally via the spool shaft 7s as the clutch actuating member 40 is rotationally driven.

The actuating plate 42 is attached to an intermediate portion of the clutch actuating member 40 to constantly bias the clutch actuating member 40 toward the spool side, and in this state, as illustrated in FIG. 3, the engaging portion 40a of the clutch actuating member 40 is fitted to the locking portion 7h of the spool shaft 7s to be in a power transmission state (clutch ON). Then, when the clutch operation lever (hereinafter, referred to as "clutch lever") 45 is rotated, as illustrated in FIGS. 3 and 4, an eccentric protrusion 45b of an actuating body 45a that rotates integrally with the clutch lever 45 is engaged with an engagement elongated hole 43b formed at the end of the clutch plate 43 to slide the clutch plate 43 toward an axis of the clutch actuating member 40, and a cam member 43a provided on a front surface pushes up the actuating plate 42 against a biasing force to slide the clutch actuating member 40 toward the right side plate side. In this state, the engaging portion 40a of the clutch actuating member 40 is disengaged from the locking portion 7h, and enters a power interruption state as illustrated in FIG. 3 (clutch OFF). Return from the clutch-OFF state to the clutch-ON state is performed by a winding operation of the manual handle 6, a rotation operation of the clutch lever 45, or the like by a known return mechanism.

FIGS. 2 to 4 schematically illustrate a basic configuration and a basic structure of the actuating body 45a and the eccentric protrusion 45b connected to the clutch lever 45. Details of the clutch lever 45 and the actuating body 45a are illustrated in FIGS. 5 to 9.

Figure 5:
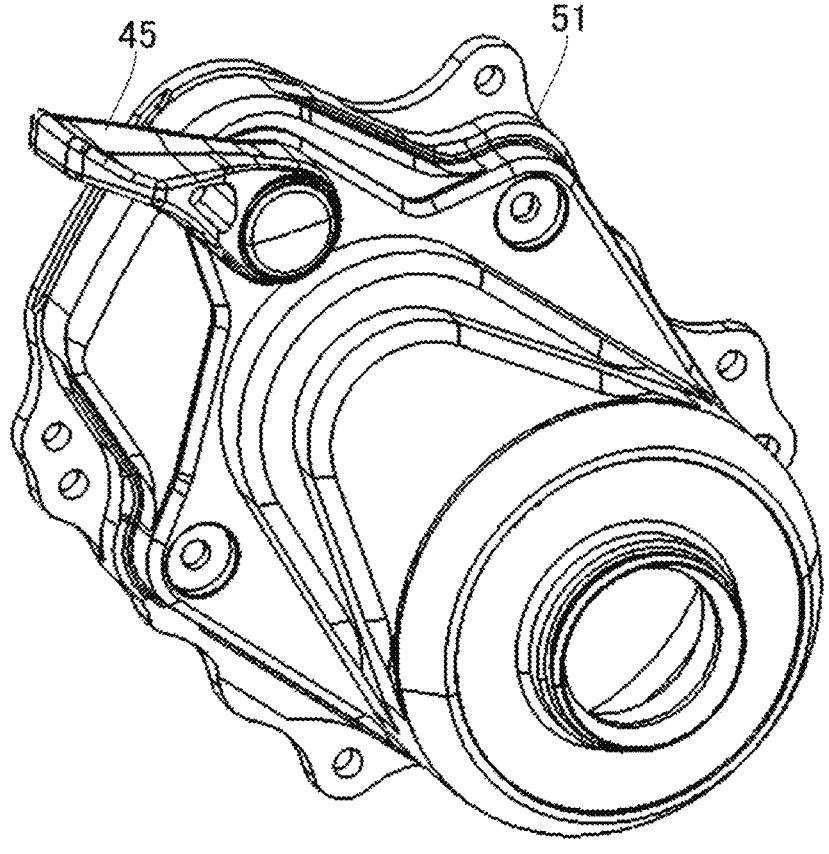
FIG. 5 is a perspective view illustrating a support case that supports a clutch lever from a front side.

FIG. 5 illustrates the clutch lever 45 and a support case 51 that supports the clutch lever 45, from the outside. The support case 51 is attached to the outside of the right side plate 4b, and configures a part of the appearance design of the fishing electric reel 1. The handle shaft 6a of the manual handle 6 passes through the support case 51. In FIGS. 2 to 4, illustration of a boundary portion between the right side plate 4b and the support case 51 is omitted.

Figure 6:
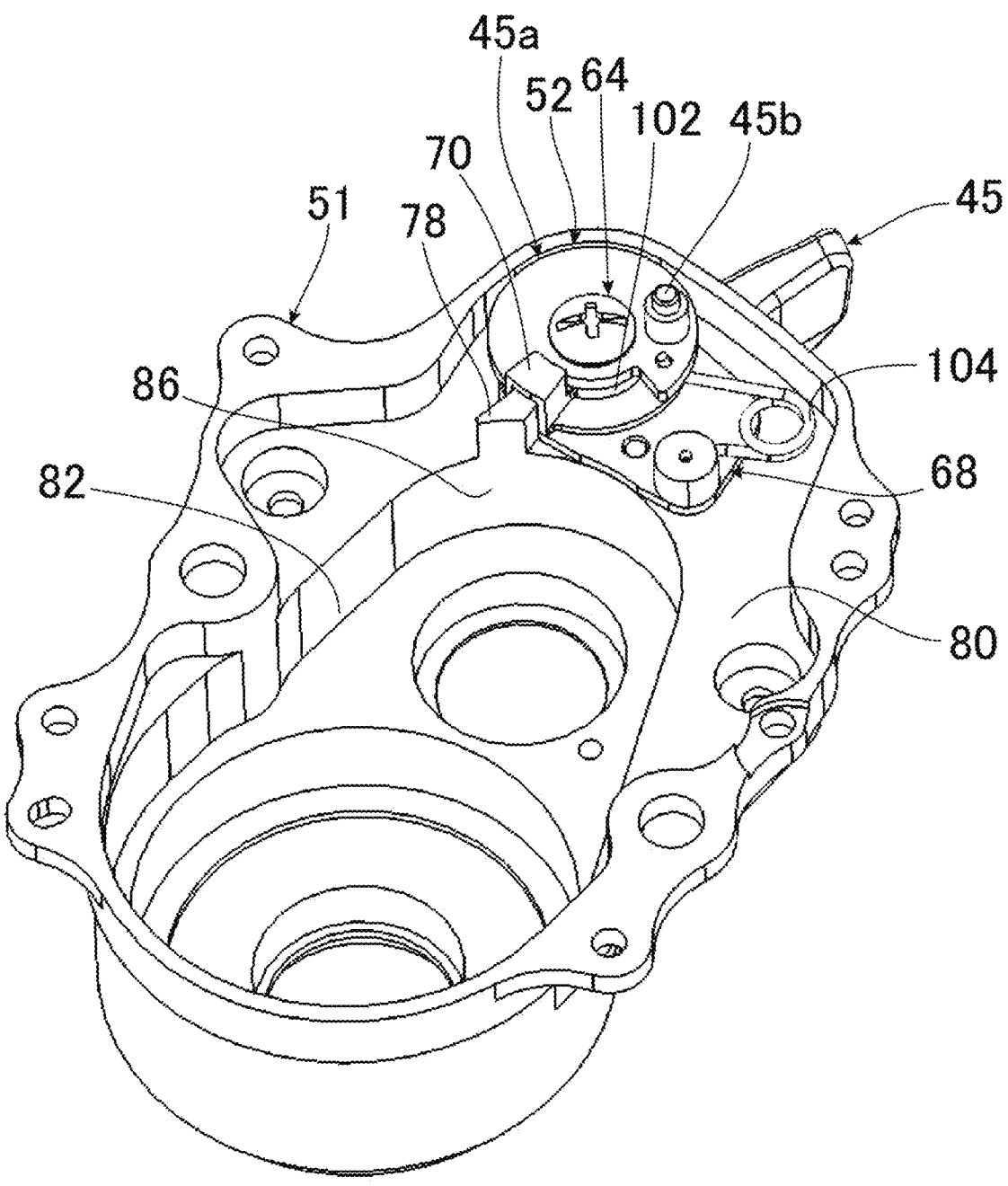
FIG. 6 is a perspective view illustrating the support case that supports the clutch lever from a back side.
Figure 7:
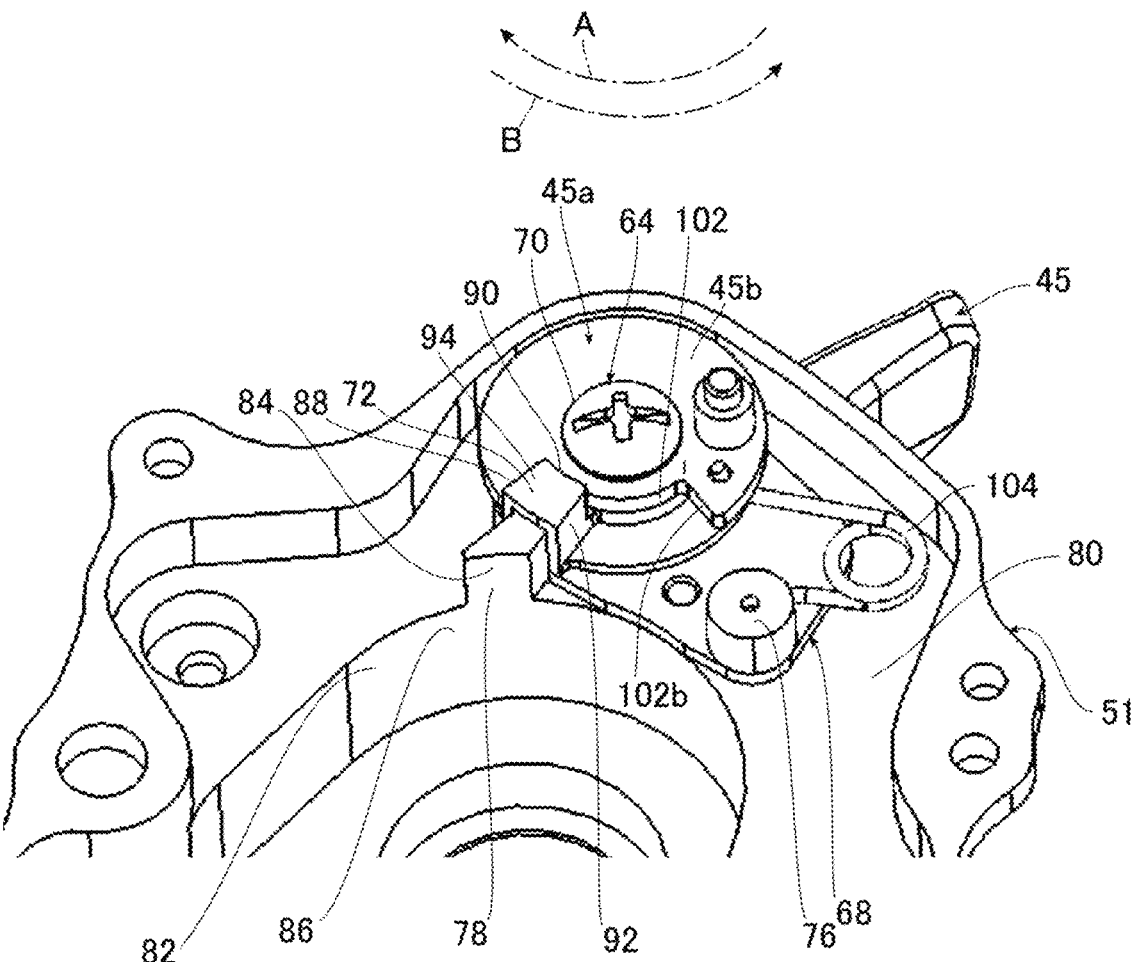
FIG. 7 is an enlarged perspective view illustrating a clutch rotation mechanism unit.
Figure 8:
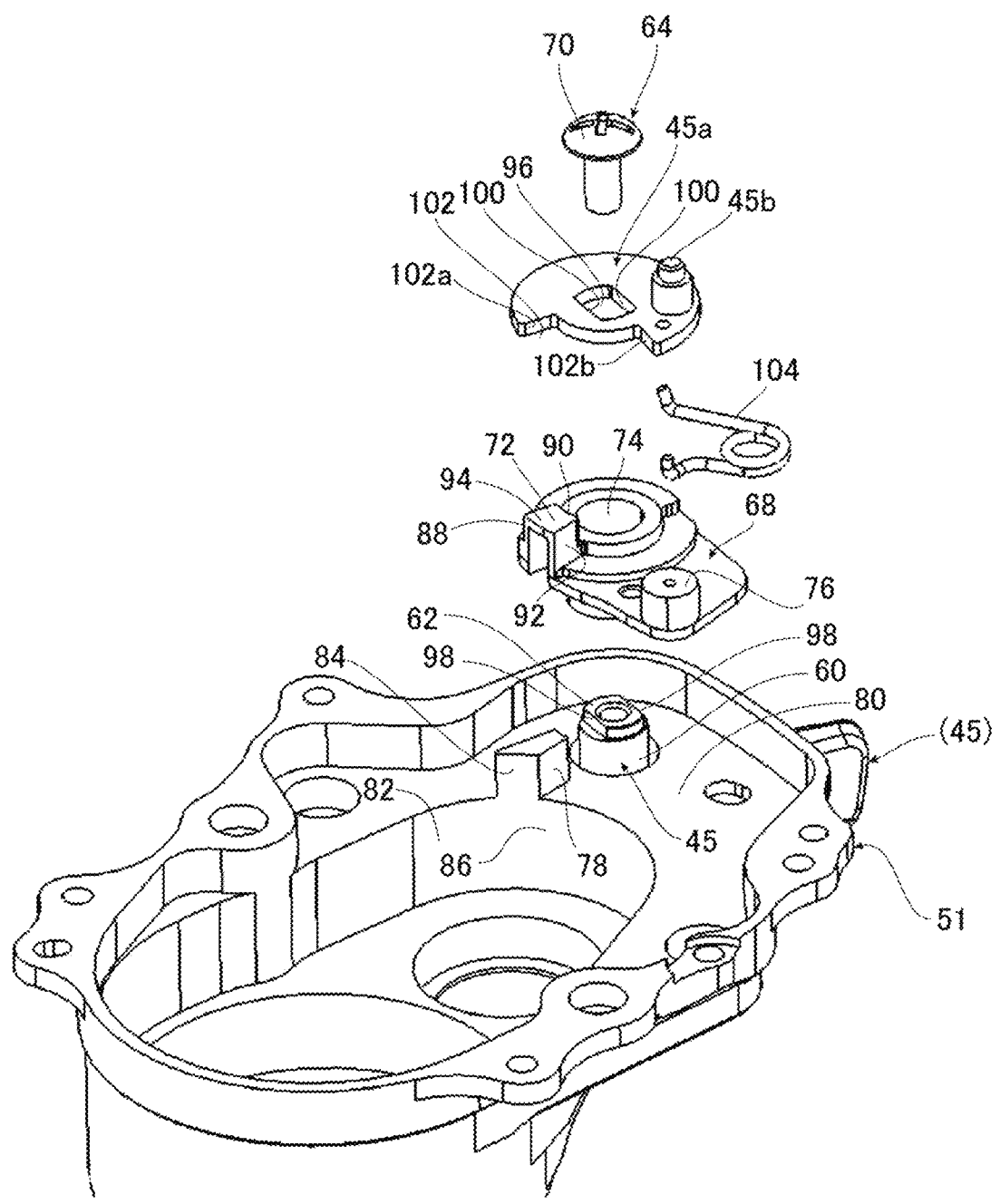
FIG. 8 is an exploded perspective view illustrating the clutch rotation mechanism unit.
Figure 9:
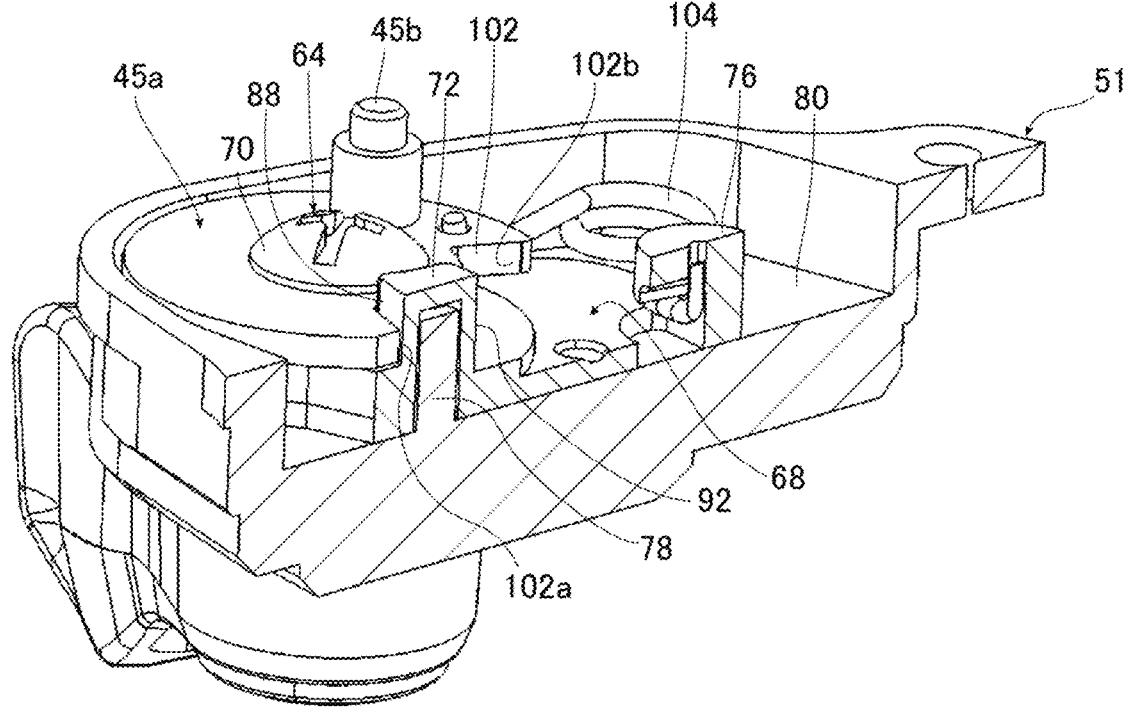
FIG. 9 is an enlarged cross-sectional view illustrating a cover portion and a peripheral portion of the cover portion in a bearing member.

FIG. 6 illustrates an inside of the support case 51, and FIG. 7 illustrates a part of FIG. 6 in an enlarged manner. FIG. 8 illustrates a clutch rotation mechanism unit 52 in an exploded manner. The clutch rotation mechanism unit 52 enables rotation (rotational drive) of the clutch lever 45 at a predetermined angle.

As illustrated in FIG. 5, the clutch lever 45 is disposed outside of the support case 51. As illustrated in FIGS. 6 to 8, a clutch lever attachment screw 64 is screwed into a tip end 62 (FIG. 8) in a proximal end 60 of the clutch lever 45 from the inside of the support case 51. In FIG. 8, illustration of a screw groove portion of the clutch lever attachment screw 64 and a screw hole provided in the tip end 62 of the clutch lever 45 is omitted.

As illustrated in FIG. 7, the clutch lever attachment screw 64 is inserted into an actuating body (claw member) 45a as an actuating member and an actuating body receiving seat 68. As illustrated in FIG. 6, the actuating body 45a and the actuating body receiving seat 68 are sandwiched between a head portion 70 of the clutch lever attachment screw 64 and the support case 51. The actuating body 45a and the actuating body receiving seat 68 are supported by the support case 51 together with the clutch lever 45. Here, the actuating body 45a is schematically illustrated in FIGS. 3 and 4 described above. Further, the actuating body receiving seat 68 is not illustrated in FIGS. 3 and 4 described above.

Among these, the actuating body receiving seat 68 (actuating member receiving seat 68) is formed in a plate shape having a recess-and-projection, and a material of the actuating body receiving seat 68 is a synthetic resin (for example, polyacetal, polyphenylene sulfide (PPS), glass fiber-containing nylon, and the like) having sufficient wear resistance and lubricity, but may be made of a light metal or the like having lower rigidity than a metal material forming the support case 51 described below. When the light metal is adopted, coating with an insulating resin may be applied in order to prevent occurrence of electrolytic corrosion due to seawater. The actuating body receiving seat 68 has a cover portion 72 formed in a rectangular gate shape, a hole portion 74 (FIG. 8) formed in a perfect circular shape, a cylindrical boss portion 76, and the like. The cover portion 72 and the boss portion 76 are integrally formed with the actuating body receiving seat 68.

The cover portion 72 has an inner shape that matches a rectangular protrusion 78 formed on the support case 51, and covers a part of the protrusion 78. The protrusion 78 is formed integrally with the support case 51. The support case 51 comprising the protrusion 78 is formed by shaving a metal material (for example, aluminum alloy, magnesium alloy, stainless steel, and the like), but may be formed by die-casting aluminum or the like. The protrusion 78 protrudes perpendicularly from a flat surface portion 80 formed inside of the support case 51. An oval portion 82 adjacent to the flat surface portion 80 is formed inside of the support case 51. The oval portion 82 is, for example, an oval recess.

The protrusion 78 has a substantially rectangular shape, but a curved surface portion 84 (FIG. 7) which is a part of the protrusion 78 is continuous with an inner peripheral wall 86 of the oval portion 82. Furthermore, the shape of the protrusion 78 is, for example, a shape visually recognized as a quadrilateral shape (also referred to as a trapezoidal shape) when the flat surface portion 80 is viewed from the front.

As illustrated in FIGS. 7 and 8, the cover portion 72 covering such a protrusion 78 has a first side portion 88, a second side portion 90, a third side portion 92 configuring three side surfaces, and a flat portion 94 located at a tip end (tip). The first side portion 88 to the third side portion 92 and the flat portion 94 are integrally molded and continuous. The first side portion 88 to the third side portion 92 are joined and reinforced via the flat portion 94. The first side portion 88 and the third side portion 92 are joined and reinforced via the third side portion 92 and the flat portion 94.

As described above, the cover portion 72 covers the protrusion 78 of the support case 51, and partially covers the protrusion 78 in a state of being substantially in contact with the protrusion 78. In addition, the cover portion 72 is locked to the protrusion 78 in a state of being fitted to the protrusion 78. Then, a position and a direction of the actuating body receiving seat 68 are determined to be constant by shape consistency between the cover portion 72 having the first side portion 88, the second side portion 90, the third side portion 92, and the flat portion 94 and the rectangular protruding protrusion 78.

In the examples of FIGS. 6 and 7, a part of the protrusion 78 (here, about a half to a little more than a half) is exposed from the cover portion 72. However, the present invention is not limited thereto, and for example, most or the whole of the protrusion 78 may be covered with the cover portion 72.

The proximal end 60 of the clutch lever 45 penetrates the hole portion 74 (FIG. 8) of the actuating body receiving seat 68. When the clutch lever 45 is rotationally displaced, the proximal end 60 is rotationally displaced while sliding inside of the hole portion 74.

Subsequently, the above-described actuating body 45a is overlapped on the actuating body receiving seat 68. The actuating body 45a is mostly formed in a disk shape and has the above-described eccentric protrusion 45b (FIGS. 3, 4, and 6 to 8). A long hole portion 96 (FIG. 8) is formed in a central portion of a plate surface of the actuating body 45a, and the long hole portion 96 penetrates the actuating body 45a.

The tip end 62 in the proximal end 60 of the clutch lever 45 is inserted into the long hole portion 96. A linear portion 98 is formed by chamfering at the tip end 62 of the clutch lever 45. The shape of the long hole portion 96 in the actuating body 45a matches the shape of the tip end 62 of the clutch lever 45, and the tip end 62 can be locked to a linear edge portion 100 of the long hole portion 96 with substantially no gap.

When the clutch lever 45 is rotationally displaced, the actuating body 45a is also integrally rotationally displaced in a state of being locked to the tip end 62 of the clutch lever 45. That is, the tip end 62 of the clutch lever 45 functions as a key (barb) or a joint, and a rotational force of the clutch lever 45 is transmitted to the actuating body 45a via the tip end 62. As a result, the actuating body 45a is rotationally displaced together with the clutch lever 45.

The actuating body 45a has an arc-shaped notch portion 102 at a part of an outer peripheral edge portion, and the cover portion 72 of the actuating body receiving seat 68 enters the notch portion 102 together with the protrusion 78 (FIGS. 6 and 7). In addition, the actuating body 45a and the actuating body receiving seat 68 are connected via a torsion coil spring 104 (indicated by a two-dot chain line in FIG. 7). In a state where the clutch lever 45 is not rotationally displaced, the actuating body 45a receives a biasing force of the torsion coil spring 104, and as illustrated in FIG. 7, one edge portion 102a of the notch portion 102 interferes with the first side portion 88 of the cover portion 72.

On the other hand, when the clutch lever 45 is rotationally displaced, the actuating body 45a is also rotationally displaced as indicated by an arrow A while resisting the biasing force of the torsion coil spring 104. At this time, a positional relationship between the notch portion 102 of the actuating body 45a and the cover portion 72 of the actuating body receiving seat 68 relatively changes.

When a rotational displacement amount of the actuating body 45a reaches a predetermined amount (angle at which the notch portion 102 extends), the other edge portion 102b of the notch portion 102 interferes with the third side portion 92 of the cover portion 72, and the actuating body 45a stops. Then, as described above, the eccentric protrusion 45b of the actuating body 45a slides the clutch plate 43 (FIGS. 2 and 3) toward the axis of the clutch actuating member 40. As a result, the engaging portion 40a of the clutch actuating member 40 is disengaged from the locking portion 7*h*, and enters the power interruption state as illustrated in FIG. 4 (clutch OFF).

When the clutch lever 45 is released, the biasing force of the torsion coil spring 104 causes the actuating body 45*a* to return in the opposite direction as indicated by an arrow B (FIG. 7). When the edge portion 102*a* of the notch portion 102 described above interferes with the cover portion 72 of the actuating body receiving seat 68, the clutch lever 45 returns to the original position and stops.

The fishing electric reel 1 comprising the clutch rotation mechanism unit 52 and the clutch mechanism 18 comprises the actuating body receiving seat 68, the actuating body receiving seat 68 is supported by the support case 51, the rigidity of the material forming the actuating body receiving seat 68 is lower than the rigidity of the material forming the support case 51, and the actuating body receiving seat comes into contact with the support case 51 and interferes with the actuating body 45*a* that is rotationally displaced to stop the actuating body 45*a*. Therefore, for example, an operation force applied to the clutch lever 45 by a user is transmitted to the support case 51 formed of a material having relatively higher rigidity than the actuating body receiving seat 68 via the actuating body receiving seat 68. As a result, the operation force of the user can be supported by the highly rigid component, and sufficient strength can be obtained.

In addition, the actuating body receiving seat 68 comprises the cover portion 72, and the cover portion 72 is locked to the protrusion 78 formed in the support case 51 and interferes with the actuating body 45*a* that is rotationally displaced. Therefore, an operation force transmission path from the actuating body receiving seat 68 to the support case 51 can be reliably and easily formed.

In addition, the cover portion 72 that interferes with the actuating body 45*a* has the first side portion 88 and the third side portion 92, and the first side portion 88 and the third side portion 92 are reinforced by the second side portion 90 and the flat portion 94. Therefore, higher rigidity can be secured for the cover portion 72.

Further, the cover portion 72 is formed in a gate shape and covers the protrusion 78. Therefore, it is possible to easily combine the actuating body receiving seat 68 with the protrusion 78 to cover the protrusion 78.

Although the embodiment of the present invention has been described above, the present invention is not limited to the above-described embodiment, and various modifications can be made without departing from the gist thereof. For example, the clutch mechanism 18 (including the clutch rotation mechanism unit 52) may be formed on, for example, the other side plate (left side plate 4*a*). In addition, the configurations of FIGS. 3 to 9 are not limited to the electric reel, and can also be adopted, for example, to a hand-winding double-shaft reel or the like.

What is claimed is:

1. A fishing reel comprising a clutch mechanism that switches a spool around which a fishing line is wound between a power transmission state and a power interruption state, wherein the clutch mechanism comprises a clutch lever, an actuating member that is connected to the clutch lever and configured to be rotationally displaced in accordance with a rotational operation of the clutch lever by a user, and a support case configured to support the clutch lever, the actuating member, and an actuating member receiving seat, the actuating member receiving seat interferes with the actuating member to stop rotation of the actuating member, and a rigidity of a material forming the actuating member receiving seat is lower than a rigidity of a material forming the support case.

2. The fishing reel according to claim 1, wherein the actuating member receiving seat comprises an abutting portion that abuts on at least one surface of a protrusion formed in the support case, and the abutting portion interferes with the actuating member that is rotationally displaced.

3. The fishing reel according to claim 2, wherein the abutting portion has an interference portion that interferes with the actuating member that is rotationally displaced, and a reinforcement portion that reinforces the interference portion.

4. The fishing reel according to claim 2, wherein the abutting portion is formed in a gate shape and covers at least a part of the protrusion.

5. The fishing reel according to claim 1, wherein the material of the support case is a metal, and the material of the actuating member receiving seat is a synthetic resin.

* * * * *